US009684915B1

(12) United States Patent
Cronin et al.

(10) Patent No.: US 9,684,915 B1
(45) Date of Patent: Jun. 20, 2017

(54) METHOD, MEDIUM, AND SYSTEM INCLUDING A DISPLAY DEVICE WITH AUTHENTICATED DIGITAL COLLECTABLES

(71) Applicant: ProSports Technologies, LLC

(72) Inventors: John E. Cronin, Bonita Springs, FL (US); Seth Melvin Cronin, Clarksville, FL (US); Nick Reasner, Miami, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,300

(22) Filed: Jul. 13, 2015

Related U.S. Application Data

(60) Provisional application No. 62/023,677, filed on Jul. 11, 2014.

(51) Int. Cl.
*G06Q 30/00* (2012.01)
*G06Q 30/06* (2012.01)
(Continued)

(52) U.S. Cl.
CPC ....... *G06Q 30/0611* (2013.01); *G06Q 20/322* (2013.01); *G06Q 50/184* (2013.01)

(58) Field of Classification Search
CPC .............. G06C 20/123; G06C 30/0601; G06C 30/0613; G06C 30/0641; G06C 30/0643; G06C 30/0603
(Continued)

(56) References Cited

U.S. PATENT DOCUMENTS 5,748,731 A * 5/1998 Shepherd ............... G06Q 30/06
705/57
6,061,656 A * 5/2000 Pace ....................... G06F 21/10
380/277

(Continued)

FOREIGN PATENT DOCUMENTS

CA 2 806 881 2/2012
EP 2 725 541 4/2014
(Continued)

OTHER PUBLICATIONS

Liu, Qiong "Digital rights management for content distribution." Proceedings of the Australasian information security workshop conference on ACSW frontiers 2003-vol. 21. Australian Computer Society, Inc., 2003.*

(Continued)

*Primary Examiner* — Matthew Zimmerman
(74) *Attorney, Agent, or Firm* — Polsinelli LLP

(57) ABSTRACT

A fan network system provides portals that can be accessed by fan mobile devices to buy, sell, or trade digital trading cards. The fan network system can keep track of these purchases and trades using a database that keeps track of cards and a database that keeps track of user accounts. The fan network system also provides portals that can be accessed by fan mobile devices to buy or cancel subscriptions, such as magazine subscriptions or television channel subscriptions. The fan network system also provides portals that can be accessed by fan mobile devices to redeem codes for digital trading cards, the codes given during sporting events, or in exchange for subscriptions, or through fan club memberships, or through fantasy league memberships.

17 Claims, 8 Drawing Sheets

(51) Int. Cl.
*G06Q 20/32* (2012.01)
*G06Q 50/18* (2012.01)

(58) Field of Classification Search
USPC .................................................. 705/26.1
See application file for complete search history.

(56) References Cited

U.S. PATENT DOCUMENTS

| | | | |
|---|---|---|---|
| 6,119,229 A * | 9/2000 | Martinez | A63F 13/12 726/28 |
| 6,200,216 B1 * | 3/2001 | Peppel | A63F 9/24 463/1 |
| 6,680,715 B2 | 1/2004 | Blotky et al. | |
| 9,418,360 B1 | 8/2016 | Cronin | |
| 2002/0161666 A1 * | 10/2002 | Fraki | G06Q 30/0267 705/14.64 |
| 2004/0093266 A1 * | 5/2004 | Dohring | G06Q 30/0222 705/14.23 |
| 2004/0107170 A1 * | 6/2004 | Labrou | G06Q 20/02 705/64 |
| 2004/0172280 A1 * | 9/2004 | Fraki | G06Q 30/0267 705/26.1 |
| 2005/0289061 A1 | 12/2005 | Kulakowski et al. | |
| 2006/0234795 A1 * | 10/2006 | Dhunjishaw | G06Q 10/06 463/42 |
| 2007/0232399 A1 * | 10/2007 | Kathman | A63F 13/12 463/42 |
| 2007/0233558 A1 | 10/2007 | Jones et al. | |
| 2008/0163055 A1 * | 7/2008 | Ganz | G06Q 30/0643 715/706 |
| 2009/0029754 A1 | 1/2009 | Slocum et al. | |
| 2009/0299891 A1 * | 12/2009 | Sapir | G06F 3/0483 705/37 |
| 2011/0040539 A1 | 2/2011 | Szymczyk et al. | |
| 2012/0016761 A1 * | 1/2012 | Najm | G06Q 30/06 705/26.1 |
| 2012/0303491 A1 * | 11/2012 | Hill | G06Q 30/06 705/27.2 |
| 2013/0006869 A1 * | 1/2013 | Grab | G06F 21/10 705/51 |
| 2013/0013463 A1 * | 1/2013 | McKeeman | G06Q 30/08 705/27.2 |
| 2013/0313778 A1 | 11/2013 | Thomas | |
| 2014/0178029 A1 | 6/2014 | Raheman et al. | |
| 2014/0207557 A1 * | 7/2014 | Choi | G06Q 30/0239 705/14.39 |
| 2014/0337915 A1 * | 11/2014 | Kanee | G06F 21/10 726/1 |

FOREIGN PATENT DOCUMENTS

| | | |
|---|---|---|
| WO | WO 2002/001494 | 1/2002 |
| WO | WO 2004/067286 | 8/2004 |

OTHER PUBLICATIONS

U.S. Appl. No. 14/798,262, filed Jul. 13, 2015, John E. Cronin, Digital Kiosk.
"Crew announces new video boards at Crew Stadium ahead of 2014 campaign", Crew Communications, TheCrew.com, Jan. 24, 2014.
Dawes, Robert; "Augmented Reality Athletics", BBC Research & Development Blog, Jul. 31, 2012.
"Fan Experience 2008—Raising the bar to keep fans in the fold and revenue streams flowing" Fan Experience, Special Advertising Section, Jul. 21-27, 2008.
"Goal!! EON Reality and CSM Brazil Announce Partnership for Virtual Reality Interactive Soccer Game", EON Reality, May 12, 2014.
Moscaritolo, Angela; "Keep Tabs on Lebron With New Galaxy-Focused App", News & Opinion, PCMag.com, May 1, 2014.
"NCAA, Turner Sports, CBS Sports, Google Promote Mar. Madness Through Fan Experience", Sports Video Group, Mar. 18, 2014.
PUCA Trade; Jun. 26, 2014.
Weaver, Matthew; "Nike Stands by sponsorship of Tiger Woods despite 'indiscretions'", The Guardian, Dec. 14, 2009.
U.S. Appl. No. 14/98,262 Office Action mailed Oct. 26, 2015.

* cited by examiner

Redemptions GUI 120

Redeem Exclusive Content

1. Stadium Only Content
   Enter Ticket Number: [____415____]

2. Magazine Subscription Content
   Enter Magazine Subscription Number: [____425____]

3. Fan Club Content
   Choose Fan Club: [Broncos ▼] 435
   Username: 440
   Password:

4. Fantasy League Content
   Choose League: [Yahoo ▼] 455
   Username: 460
   Password:

Stadium Only Redemption 410
Magazine Subscription Redemption 420
Fan Club Redemption 430
Fantasy League Content 450

Trading Card Database 158

| Card Identification Field 602 | Number of Cards in Circulation 604 | Market Price Field 606 | Type of Card Field 608 | Tradable Field 610 | Master Data Field 612 | On Sale Field 614 | Date Added Field 616 | Date Updated Field 618 |
|---|---|---|---|---|---|---|---|---|
| Card ID Number | Number in Circulation | Market Price | Type | Tradable Y/N | Master Data File | On Sale Y/N | Date Added | Date Last Updated |
| A123 | 10000 | $0.00 | Free at point of purchase | No | A123.dat | No | 1.1.12 | 12.1.13 |
| B456 | 100 | $50.00 | Sports Illustrated | Yes | B456.dat | No | 1.1.12 | 12.1.13 |
| C789 | 505 | $20.00 | Stadium Only | Yes | C789.dat | No | 1.1.12 | 12.1.13 |
| D007 | 200 | $4.00 | Market | Yes | D007.dat | Yes | 1.1.12 | 12.1.13 |

FIG. 6B

User Certification Database 164

| User Identification Field 642 | User Name Field 644 | User Profile Field 646 | Cards Bought Field 648 | Cards Traded Field 650 | Cards Subscription Field 652 | Cards Redeemed Field 654 | Device Identification Field 656 |
|---|---|---|---|---|---|---|---|
| User ID | User Name | Profile | Cards Bought | Cards Traded | Subscription | Cards Redeemed | Device ID |
| Bobxy2 | Bob A. | | | | | | xy123 |

670

| Favorite Teams | Interests | Dates Log-In |
|---|---|---|
| Broncos | Buying | 1/1/13 |
| Packers | Trading | 10/8/13 |
| | Collecting | 4/15/14 |

672  674

680

| Card ID | Bought/ Traded/ Subscription/ Redeemed |
|---|---|
| A123 | N/A |
| B456 | Subscription |
| C789 | Redeemed |

682

METHOD, MEDIUM, AND SYSTEM INCLUDING A DISPLAY DEVICE WITH AUTHENTICATED DIGITAL COLLECTABLES

CROSS-REFERENCE TO RELATED APPLICATIONS

The present application claims the priority benefit of U.S. provisional application No. 62/023,677 filed Jul. 11, 2014 entitled "Versatile Display With Authenticated Digital Collectables," the disclosure of which is hereby incorporated by reference.

BACKGROUND

Field of Invention

The present invention generally relates to digital trading card management. More specifically, the present invention relates to buying, selling, and trading digital trading cards, as well as redeeming event-based or subscription-based or membership-based codes in exchange for digital trading cards.

Description of the Related Art

Trading cards are typically sold as paper cards which can be damaged or lost, and can be difficult or inconvenient to haul around. Some trading cards are rare or exclusively given out at specific events or during specific time periods, and can become very valuable over time. Because trading cards are printed on paper, they generally do not include up-to-date information about their subject (e.g., a sports player, a fictional comic book character, or a fictional game character).

Digital files, such as image files, generally cannot be used in the same manner as trading cards, because digital files are ordinarily freely transferrable and therefore cannot typically become as rare or as exclusive as trading cards. It is also difficult to sell, give, or receive data files at special events in geographic locations.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Digital payments may typically be accepted through the use of images of personal or cashier's checks, through transmission of credit card information such as credit card numbers and associated expiration dates or names or security numbers/codes, or through electronic payment services that allow money to be transferred from a payer's bank account or from a separate digital wallet account.

Thus, a means of digital trading card management is needed.

SUMMARY OF THE CLAIMED INVENTION

One exemplary method for digital trading card trading includes receiving a first trading request from a first mobile device, the first trading request identifying a first set of one or more digital trading cards to be traded. The method also includes identifying the first set of one or more digital trading cards to be traded through a trading interface accessible to a plurality of mobile devices. The method also includes receiving a second trading request from a second mobile device of the plurality of mobile devices, the second trading request making an offer for the first set of one or more digital trading cards to be traded, the offer including a second set of one or more digital trading cards. The method also includes transmitting an offer dataset to the first mobile device, the offer dataset identifying the second set of one or more digital trading cards. The method also includes receiving an affirmative response from the first mobile device. The method also includes transmitting the first set of one or more digital trading cards to the second mobile device. The method also includes deleting the first set of one or more digital trading cards from the first mobile device. The method also includes transmitting the second set of one or more digital trading cards to the first mobile device. The method also includes deleting the second set of one or more digital trading cards from the second mobile device.

One exemplary system for digital trading card trading includes a fan network. Execution of instructions stored in a memory of the fan network by a processor of the fan network performs various system operations. The system operations include receiving a first trading request from a first mobile device, the first trading request identifying a first set of one or more digital trading cards to be traded. The system operations also include identifying the first set of one or more digital trading cards to be traded through a trading interface accessible to a plurality of mobile devices. The system operations also include receiving a second trading request from a second mobile device of the plurality of mobile devices, the second trading request making an offer for the first set of one or more digital trading cards to be traded, the offer including a second set of one or more digital trading cards. The system operations also include transmitting an offer dataset to the first mobile device, the offer dataset identifying the second set of one or more digital trading cards. The system operations also include receiving an affirmative response from the first mobile device. The system operations also include transmitting the first set of one or more digital trading cards to the second mobile device. The system operations also include deleting the first set of one or more digital trading cards from the first mobile device. The system operations also include transmitting the second set of one or more digital trading cards to the first mobile device. The system operations also include deleting the second set of one or more digital trading cards from the second mobile device.

One exemplary non-transitory computer-readable storage medium is also described, the non-transitory computer-readable storage medium having embodied thereon a program executable by a processor to perform an exemplary program method for digital trading card trading that includes receiving a first trading request from a first mobile device, the first trading request identifying a first set of one or more digital trading cards to be traded. The program method also includes identifying the first set of one or more digital trading cards to be traded through a trading interface accessible to a plurality of mobile devices. The program method also includes receiving a second trading request from a second mobile device of the plurality of mobile devices, the second trading request making an offer for the first set of one or more digital trading cards to be traded, the offer including a second set of one or more digital trading cards. The program method also includes transmitting an offer dataset to the first mobile device, the offer dataset identifying the second set of one or more digital trading cards. The program method also includes receiving an affirmative response from the first mobile device. The program method also includes transmitting the first set of one or more digital trading cards to the second mobile device. The program method also includes deleting the first set of one or more digital trading cards from the first mobile device. The program method also includes transmitting the second set of one or more digital trading cards to the first mobile device. The program method also includes deleting the second set of one or more digital trading cards from the second mobile device.

BRIEF DESCRIPTION OF THE DRAWINGS

FIG. 4 illustrates an exemplary redemptions graphical user interface.
FIG. 6A illustrates an exemplary trading card database.
FIG. 6B illustrates an exemplary user certification database.

DETAILED DESCRIPTION

A fan network system provides portals that can be accessed by fan mobile devices to buy, sell, or trade digital trading cards. The fan network system can keep track of these purchases and trades using a database that keeps track of cards and a database that keeps track of user accounts. The fan network system also provides portals that can be accessed by fan mobile devices to buy or cancel subscriptions, such as magazine subscriptions or television channel subscriptions. The fan network system also provides portals that can be accessed by fan mobile devices to redeem codes for digital trading cards, the codes given during sporting events, or in exchange for subscriptions, or through fan club memberships, or through fantasy league memberships.

Figure 1:
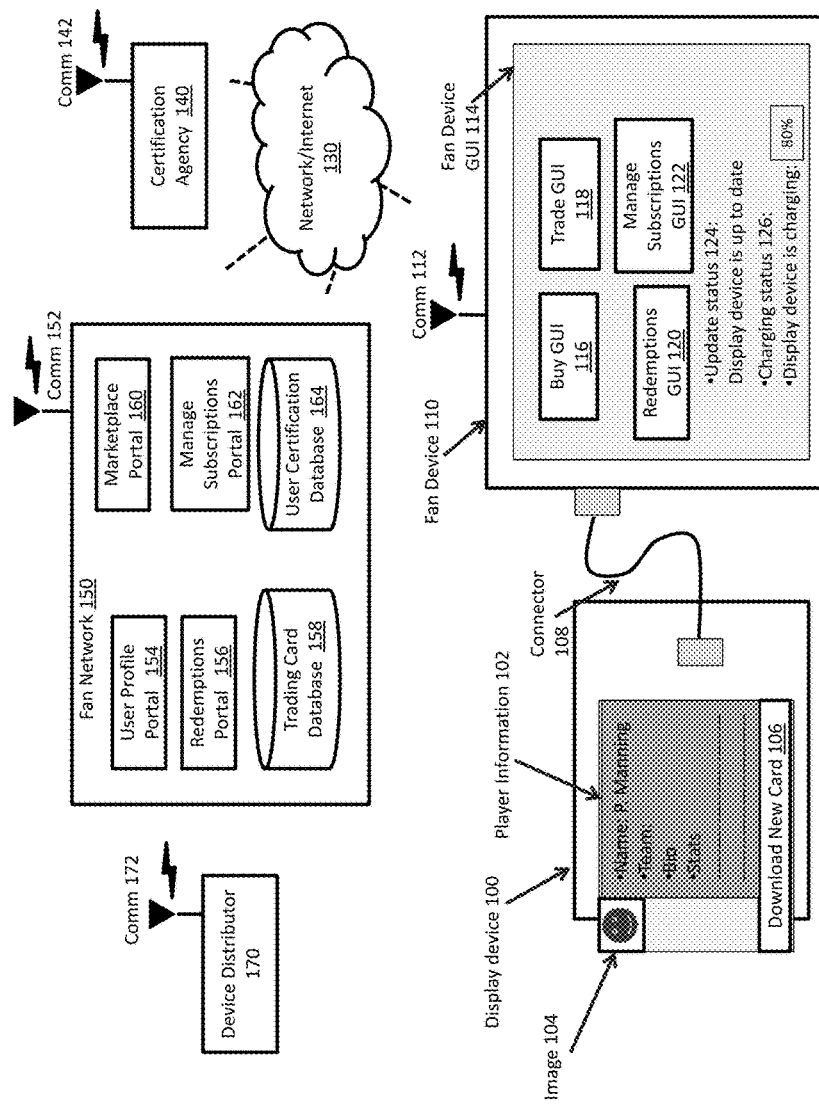
FIG. 1 illustrates an exemplary display device ecosystem.

FIG. 1 illustrates an exemplary display device ecosystem.

The display device ecosystem illustrated in FIG. 1 includes a display device 100. The display device 100 may be a portable computer system 800, or it may be a device with a subset of the components that might be found in a computer system 800. The internals of the display device 100 are illustrated further in FIG. 2. The display device 100 may be, for example, a smartphone, a tablet device, a laptop, a portable media player device, a portable video game console, or a portable e-book reader device. The display device 100 may include a flexible display and/or an electronic ink display in some embodiments.

The display device 100 may be used to display digital collectable/trading/information cards, such as digital trading cards. The digital collectable/trading/information cards may include information about particular people (e.g., sports players, racers), groups of people (e.g., sports teams, racing teams, sports associations), fictional characters (e.g., comic book characters, video game characters, card game characters or items), or groups of fictional characters (e.g., comic book character teams/races, video game character teams/races, card game teams/races).

For example, FIG. 1 illustrates a digital collectable/trading/information card for a sports player displayed on the display device 100, the card including player information 102 (e.g., name, team, biography, statistics) and an image 104 of the player. The display device 100 of FIG. 1 also includes a "Download New Card 106" graphical user interface (GUI) element (e.g., a digital button) that allows receipt of an input (e.g., a touchscreen touch-based input) to trigger an action such as downloading a new card from the Internet or from a connected device (such as the fan device 110 connected to the display device 100 in FIG. 1 using the connector 108).

The fan device 110 may be a portable or non-portable computer system 800, such as a laptop computer, a desktop computer, a smartphone, a tablet device, a portable or non-portable media player device, a portable or non-portable video game console, or an e-book reader device.

The fan device 110 may include a processor (not shown), which may be any type of processor 810. The fan device 110 may include a memory (not shown), which may include any kind of memory 820, mass storage 830, portable storage 840, or any combination thereof. The memory of the fan device 110 may store, and the processor may execute, various instructions for executing software and associated user interfaces, such as various graphical user interfaces (GUIs).

For example, the fan device 110 may execute a Fan Device GUI 114, which may include a Buy GUI 116 (e.g., with which a user can purchase new digital collectable/trading/information cards), a Trade GUI 118 (e.g., with which a user can trade digital collectable/trading/information cards with other user devices), a Redemptions GUI 120 (e.g., with which a user can redeem special location-exclusive or membership-exclusive content or digital collectable/trading/information cards) and a Manage Subscriptions GUI 122 (e.g., with which a user can manage subscriptions to membership services that grant access to membership-exclusive content or digital collectable/trading/information cards), as well as other GUIs.

The fan device 110 may also display various display status information sets, such as an update status 124 (e.g., identifying whether or not the connected display device 100 is up-to-date or requires an update or data sync) and a charging status 126 (e.g., identifying a battery charge level of the display device 100)

The connector 108 may be a cable capable of connecting the display device 100 (e.g., via a port of the display device 100) to the fan device 110 (e.g., via a port of the fan device 110). The connector 108 may include, for example, a Universal Serial Bus (USB) connector, a Thunderbolt connector, a Lightning connector, a 30-pin connector, an Ethernet connector, a modem connector, a fiber optic connector, an audio jack connector, a Video Graphics Array (VGA) connector, a High-Definition Multimedia Interface (HDMI) connector, or some combination thereof.

The display device 100 and the fan device can also be connected via a wireless connection, such as one provided by a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance power transmitter, an electromagnetic transmission module, a visible light communication (VLC) transmission module, a laser transmission module, an ultrasonic transmission module, an infrasonic transmission module, or some combination thereof.

The display device ecosystem illustrated in FIG. 1 may also include a fan network 150, a certification agency 140, and a device distributor 170. These, like the fan device 110 and the display device 100, may each be connected to the a private network (e.g., a "LAN" local area network or a "WLAN" wireless local area network) or the Internet 130 via communication modules ("comm"), which may include wired communication functionality, wireless communication functionality, or some combination thereof. Such communication modules include comm 112 of fan device 110, comm 142 of certification agency 140, comm 152 of fan network 150, comm 172 of device distributor 170, and a comm (not depicted) of the display device 100. These comms may include wired communication functionality, including, for example, a Universal Serial Bus (USB) connector, a Thunderbolt connector, a Lightning connector, a 30-pin connector, an Ethernet connector, a modem connector, a fiber optic connector, an audio jack connector, a Video Graphics Array (VGA) connector, a High-Definition Multimedia Interface (HDMI) connector, or some combination thereof. These comms may include wireless communication functionality, including, for example, a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance power transmitter, an electromagnetic transmission module, a visible light communication (VLC) transmission module, a laser transmission module, an ultrasonic transmission module, an infrasonic transmission module, or some combination thereof.

The fan network 150 may include one or more computer systems 800, which may include multiple computer systems 800 networked together (e.g., in a "LAN" local area network or a "WLAN" wireless local area network), multiple computer systems 800 distributed throughout the Internet 130, or some combination thereof.

The fan network 150 may include a memory (not shown), which may include any kind of memory 820, mass storage 830, portable storage 840, or any combination thereof. The memory may be used to store a trading card database 158, which may store information relating to the digital collectable/trading/information cards, which may be trading cards. The memory may be used to store a user certification database 164, which may store information relating to users and user accounts.

The memory of the fan network 150 may also store, and one or more processors may execute and provide network portal hosting support for, several network portals (e.g., public Internet web pages or private intranet network portals). These may include a user profile portal 154 (e.g., which may be used by fans to create/edit user accounts and personalize the fan's user experience), a redemptions portal 156 (which may allow a fan use redeem codes or membership logins or event checkins for merchandise or digital collectable/trading/information cards), a marketplace portal 160 (which may allow for the buying and trading of merchandise and digital collectable/trading/information cards), and a manage subscriptions portal 162 (which may allow users to buy, view, and manage their subscriptions).

The certification agency 140 may include one or more computer systems 800, which may include multiple computer systems 800 networked together (e.g., in a "LAN" local area network or a "WLAN" wireless local area network), multiple computer systems 800 distributed throughout the Internet 130, or some combination thereof. The certification agency 140 may be an agency that has at least some of the rights to information displayed on the digital collectable/trading/information cards. For example, the certification agency 140 may be a sports agency or a memorabilia agency, such the National Football League (NFL), Major League Baseball (MLB), the National Hockey League (NHL), the Federation Internationale de Football Association (FIFA), the National Basketball Association (NBA), or another agency. The certification agency 140 may also be a company or organization related to comics, video games, or card games, such as DC Comics, Marvel Comics, Nintendo, or Wizards of the Coast.

The device distributor 170 may include one or more computer systems 800, which may include multiple computer systems 800 networked together (e.g., in a "LAN" local area network or a "WLAN" wireless local area network), multiple computer systems 800 distributed throughout the Internet 130, or some combination thereof. The device distributor may be an entity selling the display device 100, such as Wal-Mart or Best Buy, or may be a manufacturer of the display device 100, such as Apple or Samsung or LG.

The digital collectable/trading/information cards of FIG. 1 may be related to an event, such as a sports game event, or any other type of events, public or private, such as entertainment or cultural events that are presented at a theater, gymnasium, church, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

Figure 2B:
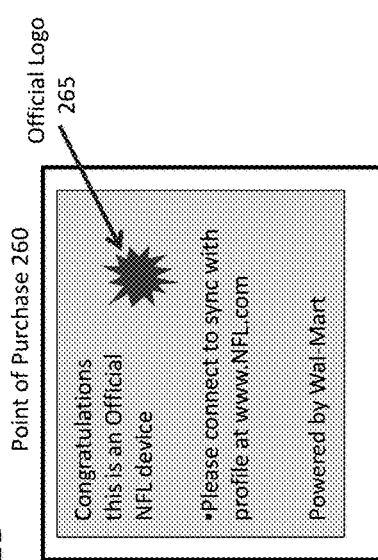
FIG. 2B illustrates an exemplary point of purchase.
Figure 2A:
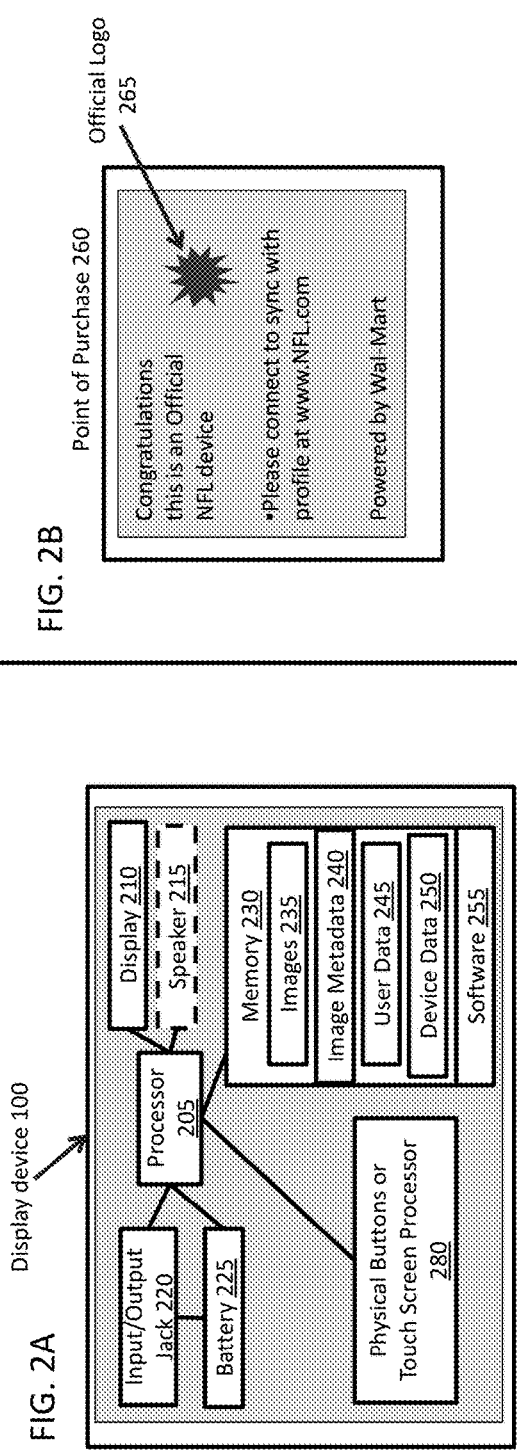
FIG. 2A illustrates an exemplary display device.

FIG. 2A illustrates an exemplary display device.

The display device 100 is illustrated in a component view in FIG. 2A. The display device 100 includes a processor 205, which may be any kind of processor 810. The display device 100 includes a memory 230, which may be any kind of memory 820, mass storage 830, portable storage 840, or any combination thereof.

The display device 100 also includes an input/output jack 220, which may be part of the comm described in FIG. 1, and may for example be a port allowing insertion of an end of a connector 108 that connects the display device 100 to the fan device 110. The display device 100 also includes a battery 225, which may be any kind of rechargeable or replaceable battery. The display device 100 also includes a display 210, which may be any kind of display system 870 and may be used to output at least the digital collectable/trading/information cards stored at the display device 100. The display device 100 may also include physical buttons or a touchscreen processor 280, to enable the display device 100 to receive inputs from a user. The display device 100 may also optionally include a speaker 215 to output audio output (e.g., music or audio portion of a video) or a microphone (not shown) as an additional method of obtaining an input from a user.

The memory 230 of the display device 100 may store elements related to digital collectable/trading/information cards, such as images 235 (e.g., which may include a collection of card images 104), image metadata 240 (e.g., identifying information about the images 235 such as previous owners, age of the images, resolution of the images), user data 245 (e.g. information about the user that owns or uses the display device 100, such as login or payment information), device data 250 (e.g., information about the display device 100), and software 255 (e.g., which may include operating systems, image viewers, card viewers, reader software, connectivity software, and other software allowing the display device 100 to operate as described).

FIG. 2B illustrates an exemplary point of purchase.

The point of purchase 260 is an initial "startup" or "boot" screen of the display device 100, or a screen that is displayed upon purchase of the display device 100 by a user. For example, the point of purchase 260 screen of the display device 100 may include an official logo 265 confirming that the display device 100 is authentic and/or that it is associated with the device distributor 170, the fan network 150, and/or the certification agency 140. The official logo 265 may be related to any combination of these three entities or to a fourth certifying entity, such as a security entity (e.g., Verisign).

Figure 2C:
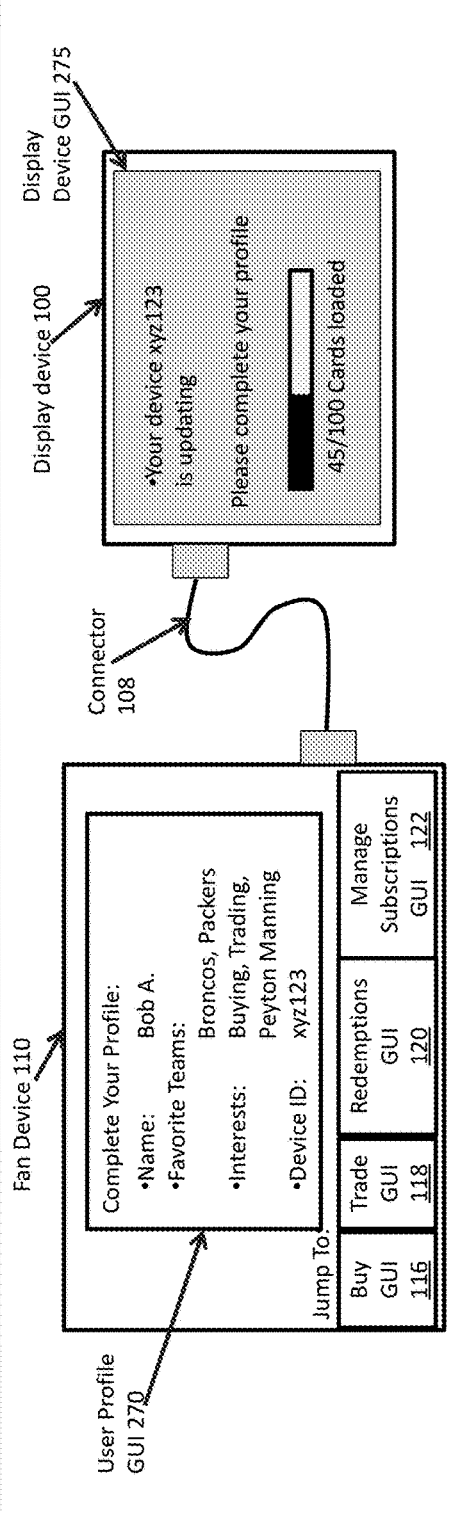
FIG. 2C illustrates an exemplary fan device connected to an exemplary display device.

FIG. 2C illustrates an exemplary fan device connected to an exemplary display device.

The fan device 110 of FIG. 2C is illustrated executing a user profile GUI 270, which allows a user to input user and device information such as the user's name (e.g. "Bob A."), the user's favorite teams (e.g., "Broncos" and "Packers"), and the user's interests (e.g., "Buying," "Trading," "Peyton Manning"), and the device identifier (ID) of the display device 100 (e.g., "xyz123").

The user profile GUI 270 of FIG. 2C also includes GUI elements (e.g. touchscreen buttons) allowing the user of the fan device 110 to enter the Buy GUI 116, the Trade GUI 118, the Redemptions GUI 120, or the Manage Subscriptions GUI 122.

The display device 100 of FIG. 2C is illustrated executing a display device GUI 275 that identifies that the display device 100 is updating (e.g., which may include firmware/software updates as well as transfer/synching of data) and that 45 of 100 of the user's digital collectable/trading/information cards have been transferred to the display device 100 either directly from the fan device 110 or from the fan network 150 through the fan device 110.

Figure 3:
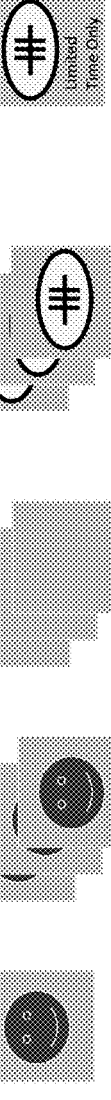
FIG. 3 illustrates an exemplary marketplace graphical user interface.

FIG. 3 illustrates an exemplary marketplace graphical user interface.

The marketplace GUI 300 of FIG. 3 includes a Buy GUI 116, allowing users to view preview images, descriptions, and prices for various individual digital collectable/trading/information cards or sets of digital collectable/trading/information cards, and to buy the individual digital collectable/trading/information cards or sets of digital collectable/trading/information cards.

The marketplace GUI 300 of FIG. 3 includes a Purchase Subscriptions GUI 310, allowing users to view logo images, descriptions, and prices for various subscription services, such as sports game season passes or sports television highlights or sports television channels, and to buy and subscribe to these subscription services. Some of these subscription services may include exclusive or rare merchandise, such as exclusive/rare digital collectable/trading/information cards or exclusive/rare sets of digital collectable/trading/information cards.

The marketplace GUI 300 of FIG. 3 includes a Trade GUI 118, allowing users to view preview images and descriptions of goods and services owned by other users, and to make offers on those goods and services or decide that they are not interested. Such goods and services may include, for example, subscription services as described in the Purchase Subscriptions GUI 310, or individual digital collectable/trading/information cards, or sets of digital collectable/trading/information cards.

FIG. 4 illustrates an exemplary redemptions graphical user interface.

The redemptions GUI 120 of FIG. 4 includes various methods of redeeming event-based or subscription-based merchandise, such as exclusive or rare digital collectable/trading/information cards.

For example, the redemptions GUI 120 of FIG. 4 includes a stadium-only redemption 410 option, which can allow users to redeem merchandise by entering a ticket number 415, or by "checking in" at an event venue through a social media platform, or by entering a code given only at an event venue (e.g., which might only work during the duration of the event).

The redemptions GUI 120 of FIG. 4 also includes a magazine subscription redemption 420 option, which can allow users to redeem merchandise by entering a magazine subscription number 425, or by entering a code given within a particular magazine issue.

The redemptions GUI 120 of FIG. 4 also includes a fan club redemption 430 option, which can allow users to redeem merchandise by identifying a fan club 435 (e.g., a "Broncos" sports team fan club) and by entering username and/or password login information 440, or by entering a code only visible to members who are logged in to a fan club website.

The redemptions GUI 120 of FIG. 4 also includes a fantasy league redemption 450 option, which can allow users to redeem merchandise by identifying a fantasy league 455 (e.g., a "Yahoo" fantasy league or fantasy league providing entity) and by entering username and/or password login information 460, or by entering a code only visible to members who are logged in to a fantasy league website.

Figure 5:
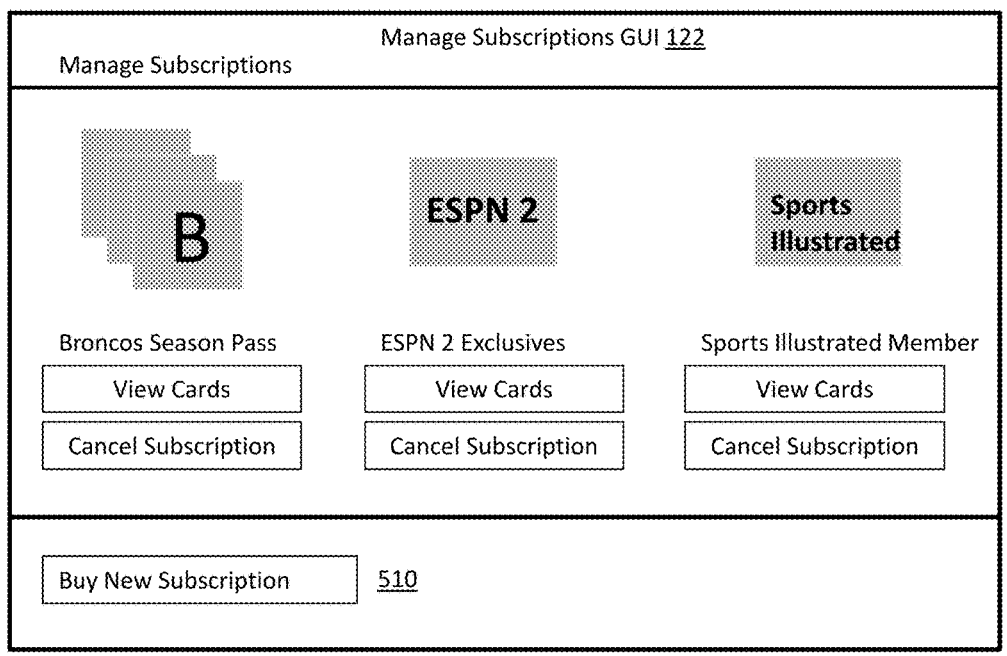
FIG. 5 illustrates an exemplary manage subscriptions graphical user interface.

FIG. 5 illustrates an exemplary manage subscriptions graphical user interface.

The manage subscriptions GUI 122 may allow a user to keep track and manage his or her existing subscriptions, the merchandise (e.g., digital collectable/trading/information cards) received/redeemed from the subscriptions, buy new subscriptions, cancel existing subscriptions, and view upcoming material (e.g., a preview of next month's magazine issue).

The manage subscriptions GUI 122 of FIG. 5 in particular illustrates that the user is currently subscribed to three subscriptions—a "Broncos" sports team event season pass and exclusive associated content, a "ESPN 2 exclusives" television channel and exclusive associated content, and a "Sports Illustrated" magazine subscription and exclusive associated content. All three subscriptions include image previews and descriptions. All three subscriptions appear to include exclusive merchandise (e.g., digital collectable/trading/information cards) that can be viewed through a "view cards" GUI element (e.g., GUI button) located underneath each identified subscription. All three subscriptions can be cancelled using a "cancel subscription" GUI element (e.g., GUI button) located underneath each identified subscription.

The manage subscriptions GUI 122 of FIG. 5 also includes a "Buy new subscription" GUI element 510 (e.g., GUI button) allowing the user to purchase new subscriptions, for example using the Purchase Subscriptions GUI 310 of FIG. 3 or a similar GUI.

FIG. 6A illustrates an exemplary trading card database.

The exemplary trading card database 158 of FIG. 6A includes various column fields identifying various types of information about various digital collectable/trading/information cards. For example, the trading card database 158 of FIG. 6A includes a "card identification field 602," which may identify a unique alphanumeric identifier for each digital collectable/trading/information card, or for each "version" of card (e.g., all trading cards showing a particular sports player from a particular year, month, season, or card mint cycle may have the same unique identifier).

The "number of cards in circulation" field 604 may identify how many of the card identified in field 602 exist in circulation. The "market price" field 606 may identify how much (e.g., in dollars or another currency) the card identified in field 602 is worth (e.g., in mint condition, or in at least good condition). The "type of card" field 608 may identify the potential sources (e.g., stadium event, magazine subscription, free at point of purchase, market purchase) of the card identified in field 602. The "tradable" field 610 may identify whether the card identified in field 602 can be traded (e.g., a digital flag may be raised indicating that certain cards cannot be traded, which may be enforced using digital rights management systems). The "master data" field 612 may identify a data file storing the data that makes up at least part of the card identified in field 602. The "on sale" field 614 may identify whether the card identified in field 602 is currently being sold on the market. The "date added" field 616 may identify when the card identified in field 602 was minted, added into circulation, or added to a particular user's collection. The "date updated" field 618 may identify when the card identified in field 602 was updated (e.g., a card associated with a particular sports player may be updated with the sports player's achievements, teams, positions, awards, and demerits as time progresses).

FIG. 6B illustrates an exemplary user certification database.

The exemplary user certification database 164 of FIG. 6B includes various column fields identifying various types of information about various users and user accounts. In particular, the exemplary user certification database 164 of FIG. 6B includes a "user identification" field 642 identifying a username (e.g., "Bobxyz") or another identifier associated with a user or user account.

The "user name" field 644 may identify the real name of the user whose user account is identified in field 642. The "user profile" field 646 may identify various details of the favorite teams 670, interests 672, and login dates 672 of the user whose user account is identified in field 642. The "cards bought" field 648 may identify the cards that the user whose user account is identified in field 642 has bought. The "cards traded" field 650 may identify the cards that the user whose user account is identified in field 642 has received or given away in one or more trades. The "cards subscription" field 652 may identify the cards that the user whose user account is identified in field 642 has received through a subscription service. The "cards redeemed" field 654 may identify the cards that the user whose user account is identified in field 642 has redeemed (e.g., through the redemptions GUI 120 of FIG. 4). The "device identification" field 656 may identify the display device 100 that the user whose user account is identified in field 642 uses to display his or her cards.

In some cases, the cards bought" field 648, the "cards traded" field 650, the "cards subscription" field 652, and the "cards redeemed" field 654 may be replaced or supplanted by another table or database which lists the cards owned by the user whose user account is identified in field 642 (e.g., under "card ID" field 680) and then identifies whether those cards were bought, traded, received via a subscription, or redeemed (e.g., under "bought/traded/subscription/redeemed" field 682).

Figure 7:
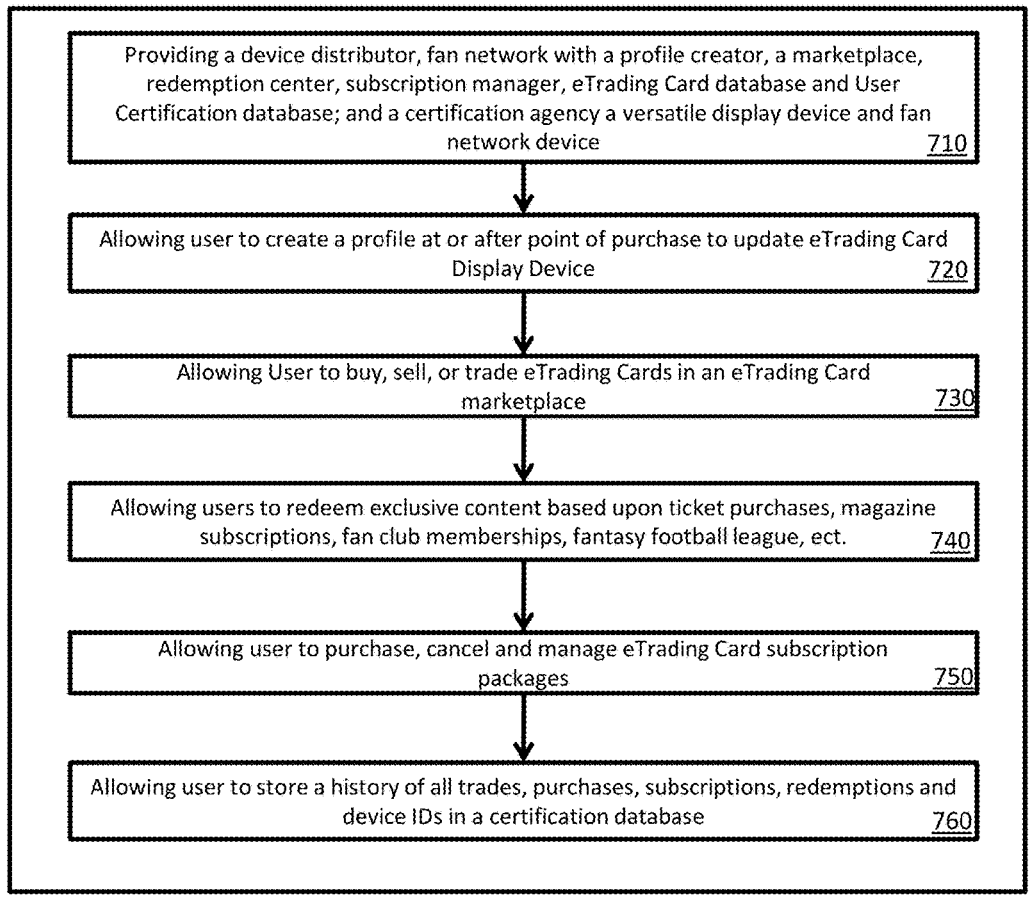
FIG. 7 illustrates an exemplary overall method of the present invention as described herein.

FIG. 7 illustrates an exemplary overall method of the present invention as described herein.

The method, in step 710, includes providing a device distributor 170, a fan network 150 with a profile creator/portal 154, a marketplace 160, redemption center 156, subscription manager 162, eTrading Card database 158, and User Certification database 164; and a certification agency 140 a versatile display device 100 and fan network device 110.

The method, in step 720, includes allowing user to create a profile at or after point of purchase 260 to update eTrading Card Display Device 100.

The method, in step 730, includes allowing a user to buy (e.g., using buy GUI 116), sell (e.g., using marketplace GUI 300), or trade (e.g., using trade GUI 118) eTrading Cards in an eTrading Card marketplace 160.

The method, in step 740, includes allowing users to redeem exclusive content (e.g., using redemption GUI 120) based upon event ticket purchases, magazine subscriptions, fan club memberships, fantasy football league memberships, or other subscription-based services and memberships.

The method, in step 750, includes allowing a user to purchase, cancel and manage eTrading Card subscription packages (e.g., using purchase subscriptions GUI 310 and manage subscriptions GUI 122).

The method, in step 760, includes allowing users to store a history of all trades, purchases, subscriptions, redemptions and device IDs in a certification database 164.

Figure 8:
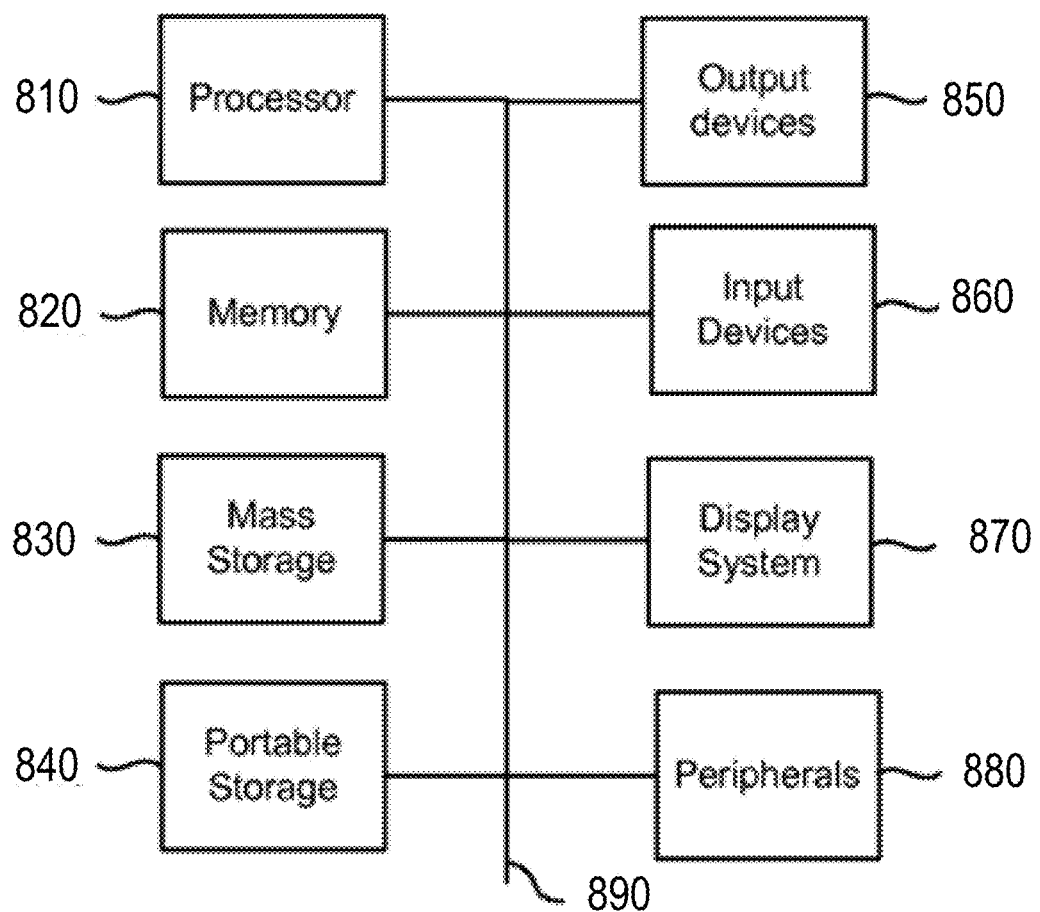
FIG. 8 is a block diagram of an exemplary computing device that may be used to implement an embodiment of the present invention.

FIG. 8 illustrates an exemplary computing system 800 that may be used to implement an embodiment of the present invention. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD), a plasma display, an organic light-emitting diode (OLED) display, an electronic ink display, or another suitable display device. Display system 870 receives textual and graphical information, and processes the information for output to the display device. The display system 870 may include touchscreen input capabilities, such as capacitive touch detection.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for digital trading card trading, the method comprising:
   receiving a first trading request from a first computing device, wherein the first trading request includes an identification of a first set of one or more digital trading cards that are to be traded and that are located on a first display device;
   verifying that the first set of one or more digital trading cards can be traded from the first display device based on first authentication information of the first display device acquired by the first computing device via a first physical connection to the first display device;
   presenting information identifying the first set of one or more digital trading cards through a trading interface accessible to a plurality of computing devices;
   receiving a second trading request from a second computing device of the plurality of computing devices, wherein the second trading request includes an identification of a second set of one or more digital trading cards that are to be traded for the first set of one or more digital trading cards and that are located on a second display device;
   verifying that the second set of one or more digital trading cards can be traded from the second display device based on second authentication information of the second display device acquired by the second computing device via a second physical connection to the second display device;
   transmitting an offer to trade the second set of one or more digital cards for the first set of one or more digital trading cards to the first computing device based on verifying that both the first display device can trade the first set of one or more digital trading cards and the second display device can trade, the second set of one or more digital trading cards;
   receiving an acceptance of the offer from the first computing device;
   transmitting the first set of one or more digital trading cards to the second display device via the second computing device;
   deleting the first set of one or more digital trading cards from the first display device via the first computing device;
   transmitting the second set of one or more digital trading cards to the first display device via the first computing device;
   deleting the second set from the second display device via the second computing device;
   storing, for a first period of time, one or more associations in a database that associate the second set of one or more digital trading cards with the first authentication information;
   receiving, within the first period of time, a first displaying request from a third computing device of the plurality of computing devices to display the second set of one or more digital trading cards on a third display device, wherein the first displaying request includes third authentication information of the third display device acquired by the third computing device via a third physical connection to the third display device; and transmitting, within the first period of time, information to the third computing device that permits the third display device to display the second set of one or more digital trading cards only when the third authentication information matches the first authentication information.

2. The method of claim 1, wherein the trading interface is a website accessible through the internet.

3. The method of claim 1, further comprising identifying that the first set of one or more digital trading cards can be traded by checking a digital rights management system.

4. The method of claim 1, further comprising identifying that the second set of one or more digital trading cards can be traded by checking a digital rights management system.

5. The method of claim 1, wherein the first set of one or more digital trading cards and the second set of one or more digital trading cards are sets of digital sport trading cards.

6. The method of claim 1, wherein the first set of one or more digital trading cards and the second set of one or more digital trading cards are sets of digital comic book trading cards.

7. The method of claim 1, wherein the first set of one or more digital trading cards and the second set of one or more digital trading cards are sets of digital gaming trading cards.

8. The method of claim 1, further comprising loading the first set of one or more digital trading cards onto the first display device before receiving the first trading request from the first computing device.

9. The method of claim 1, further comprising transmitting the first set of one or more digital trading cards to the first display device as part of a previous trade before receiving the first trading request from the first computing device.

10. The method of claim 1, further comprising:
receiving a ticket code input from the first computing device before receiving the first trading request from the first computing device, the ticket code input identifying a ticket for an event; and
transmitting the first set of one or more digital trading cards to the first display device via the first computing device upon receipt of the ticket code input.

11. The method of claim 1, further comprising:
receiving a magazine subscription code input from the first computing device before receiving the first trading request from the first computing device, the magazine subscription code input identifying a magazine subscription; and
transmitting the first set of one or more digital trading cards to the first display device via the first computing device upon receipt of the magazine subscription code input.

12. The method of claim 1, further comprising:
receiving a fan club identification input and a fan club login input from the first computing device before receiving the first trading request from the first computing device, the fan club identification input identifying a fan club associated with the first computing device and the fan club login input identifying a membership account in the fan club; and
transmitting the first set of one or more digital trading cards to the first display device the first computing device upon receipt of the fan club identification input and the fan club login input.

13. The method of claim 1, further comprising:
receiving a fantasy league identification input and a fantasy league login input from the first computing device before receiving the first trading request from the first computing device, the fantasy league identification input identifying a fantasy league associated with the first computing device and the fantasy league login input identifying a membership account in the fantasy league; and
transmitting the first set of one or more digital trading cards to the first display device via the first computing device upon receipt of the fantasy league identification input and the fantasy league login input.

14. A system of digital trading card trading, the system comprising:
one or more processors; and
memory including instructions that, upon execution by the one or more processors, cause the system to:
receive a first trading request from a first computing device, wherein the first trading request includes an identification of a first set of one or more digital trading cards that are to be traded and that are located on a first display device;
verify that the first set of one or more digital trading cards can be traded from the first display device based on first authentication information of the first display device acquired by the first computing device via a first physical connection to the first display device;
present information identifying the first set of one or more digital trading cards through a trading interface accessible to a plurality of computing devices;
receive a second trading request from a second computing device of the plurality of computing devices, wherein the second trading request includes an identification of a second set of one or more digital trading cards that are to be traded for the first set of one or more digital trading cards and that are located on a second display device;
verify that the second set of one or more digital trading cards can be traded from the second display device based on second authentication information of the second display device acquired by the second computing device via a second physical connection to the second display device;
transmit an offer to trade the second set of one or more digital cards for the first set of one or more digital trading cards to the first computing device based on verifying that both the first display device can trade the first set of one or more digital trading cards and the second display device can trade the second set of one or more digital trading cards;
receive an acceptance of the offer from the first computing device;
transmit the first set of one or more digital trading cards to the second display device via the second computing device;
delete the first set of one or more digital trading cards from the first display device via the first computing device;
transmit the second set of one or more digital trading cards to the first display device via the first computing device;
delete the second set of one or more digital trading cards from the second display device via the second computing device; and
store, for a first period of time, one or more associations in a database that associate the second set of one or more digital trading cards with the first authentication information;
receive, within the first period of time, a first displaying request from a third computing device of the plurality of computing devices to display the second set of one or more digital trading cards on a third display device, wherein the first displaying request includes third authentication information of the third display device acquired by the third computing device via a third physical connection to the third display device; and transmit, within the first period of time, information to the third computing device that permits the third display device to display the second set of one or more digital trading cards only when the third authentication information matches the first authentication information.

15. The system of claim 14, wherein the instructions upon execution further cause the system to identify that the first set of one or more digital trading cards can be traded by checking a digital rights management system.

16. The system of claim 14, wherein the instructions upon execution further cause the system to identify that the second set of one or more digital trading cards can be traded by checking a digital rights management system.

17. A non-transitory computer-readable storage medium, having embodied thereon a program executable by a processor to perform a method for digital trading card trading, the method comprising:

receiving a first trading request from a first computing device, wherein the first trading request includes an identification of a first set of one or more digital trading cards that are to be traded and that are located on a first display device;

verifying that the first set of one or more digital trading cards can be traded from the first display device based on first authentication information of the first display device acquired by the first computing device via a first physical connection to the first display device;

presenting information identifying the first set of one or more digital trading cards through a trading interface accessible to a plurality of computing devices;

receiving a second trading request from a second computing device of the plurality of computing devices, wherein the second trading request includes an identification of a second set of one or more digital trading cards that are to be traded for the first set of one or more digital trading cards and that are located on a second display device;

verifying that the second set of one or more digital trading cards can be traded from the second display device based on second authentication information of the second display device acquired by the second computing device via a second physical connection to the second display device;

transmitting an offer to trade the second set of one or more digital cards for the first set of one or more digital trading cards to the first computing device based on verifying that both the first display device can trade the first set of one or more digital trading cards and the second display device can trade the second set of one or more digital trading cards;

receiving an acceptance of the offer from the first computing device;

transmitting the first set of one or more digital trading cards to the second display device via the second computing device;

deleting the first set of one or more digital trading cards from the first display device via the first computing device;

transmitting the second set of one or more digital trading cards to the first display device via the first computing device;

deleting the second set of one or more digital trading cards from the second display device via the second computing device;

storing, for a first period of time, one or more associations in a database that associate between the second set of one or more digital trading cards with the first authentication information;

receiving, within the first period of time, a first displaying request from a third computing device of the plurality of computing devices to display the second set of one or more digital trading cards on a third display device, wherein the first displaying request includes third authentication information of the third display device acquired by the third computing device via a third physical connection to the third display device; and transmitting, within the first period of time, information to the third computing device that permits the third display device to display the second set of one or more digital trading cards only when the third authentication information matches the first authentication information.

* * * * *